TRANSFER CIRCUITS USING SATURABLE MAGNETIC CORES

Filed Dec. 7, 1959 4 Sheets-Sheet 1

Inventors
K. W. CATTERMOLE
J. C. PRICE
By C. H. Suydam
AGENT

Inventors
K. W. CATTERMOLE
J. C. PRICE
By C. H. Suydam
AGENT

TRANSFER CIRCUITS USING SATURABLE MAGNETIC CORES

Filed Dec. 7, 1959 4 Sheets-Sheet 3

Inventors
K. W. CATTERMOLE
J. C. PRICE
By C. H. Suydam
AGENT

Inventors
K. W. CATTERMOLE
J. C. PRICE
By C. H. Suydam
AGENT

United States Patent Office 3,162,843
Patented Dec. 22, 1964

3,162,843

TRANSFER CIRCUITS USING SATURABLE MAGNETIC CORES

Kenneth William Cattermole and John Clifford Price, Aldwych, London, England, assignors to International Standard Electric Corporation, New York, N.Y.

Filed Dec. 7, 1959, Ser. No. 857,880
Claims priority, application Great Britain, Jan. 8, 1959, 723/59
7 Claims. (Cl. 340—174)

The present invention relates to transfer circuits employing saturable magnetic cores, suitable for use in electric pulse distributors or counters.

A number of counting chains employing magnetic core stages have been proposed hitherto. In such arrangements usually one of the cores is in a given magnetic condition, while all the others are in the opposite condition, and means is provided so that by applying triggering or timing pulses to the cores, the given magnetic condition is effectively stepped along the series of cores, and thereby output pulses are obtained from the cores in turn.

Such arrangements often suffer from various drawbacks, such as undesirable loading of cores which are being switched, opposition between the triggering pulse and a pulse generated by a switched core, tendency for the counting to occur in the wrong direction, or for more than one count to be travelling round the counter at the same time; some of the arrangements are too slow in operation.

It is therefore the object of the invention to provide a magnetic transfer circuit for use in devices of this kind, whereby their operation may be improved.

The invention will be described with reference to the accompanying drawings, in which.

Figures 1, 2:
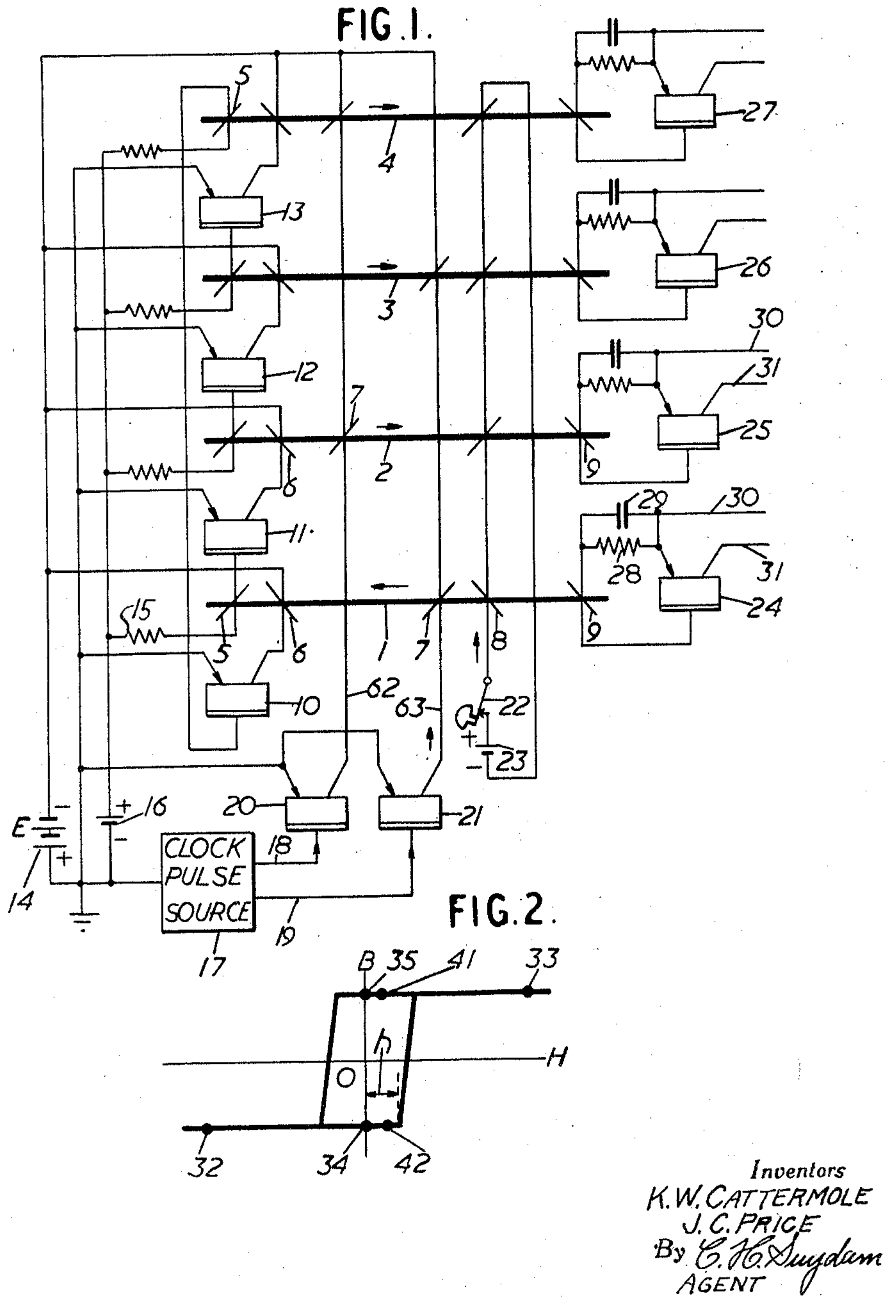
FIG. 1 shows a schematic circuit diagram of a four-stage distributor employing transfer circuits according to the invention.
FIGS. 2 and 3 show graphs used in the explanation of the operation of FIG. 1.

FIG. 1 shows a four-stage distributor to illustrate the invention. It will be evident that the arrangement can be extended on the same plane to provide any even number of stages. In FIG. 1 there are provided four trigger cores 1, 2, 3, 4 of ferrite or other suitable ferro-magnetic material having a substantially rectangular hysteresis loop. Each core is shown diagrammatically as a straight rod, though in practice it will preferably comprise a toroid or other closed magnetic circuit. A winding on the core is shown as a short inclined line which slopes upwards to the left to indicate a winding wound "straight" and to the right to indicate a winding wound "reverse." A vertical line drawn through the intersection of a winding line with the core indicates a conductor with which the winding is in series. A current flowing downwards through such a conductor in series with a straight winding will be assumed to produce a flux from left to right in the core.

Each core is provided with five windings, designated 5, 6, 7, 8, 9 on core 1. Windings 5 are transfer windings having 8 turns, for example, wound reverse. Windings 6 are setting windings having 20 turns, for example, wound straight. Windings 7 are triggering or switching windings having 20 turns, for example, wound reverse. Windings 8 are starting windings having 1 turn, for example, wound straight on core 1 and reverse on the other cores. Windings 9 are output windings having 10 turns, for example, wound straight.

Four transistors 10, 11, 12 and 13 used as unidirectional transfer devices, are provided for coupling adjacent cores as shown. Transistor 11, for example, has its emitter electrode connected to ground, and its collector electrode connected through the setting winding 6 of core 2 to the negative terminal of a direct current source 14, the positive terminal of which is connected to ground. This source may, for example, supply a potential of 4.5 volts. The base electrode of transistor 11 is connected through the transfer winding 5 of core 1 and through a resistor 15, which may, for example, have a value of 1000 ohms, to the positive terminal of a direct current source 16, the negative terminal of which is connected to ground. The source 16 may provide about 0.25 volt, for example. The other transfer transistors are connected in like manner between successive cores, and in order to provide a closed ring, the collector electrode of transistor 10 is connected to the setting winding 6 of core 1, and the base electrode to the transfer winding 5 of core 4.

A source 17 of negative clock pulses is provided. These pulses are supplied so that they appear alternately on conductors 18 and 19; generally, but not necessarily, at regular intervals. These conductors are connected respectively to the base electrodes of two normally blocked clock transistors 20 and 21. The emitter electrodes of these transistors are connected to ground. The collector electrode of transistor 20 is connected over a conductor 62 to the source 14 through the trigger windings 7 on the even-numbered cores, and the collector electrode of transistor 21 is connected over a conductor 63 to the source 14 through the trigger windings 7 on the odd-numbered cores.

The clock pulse source 17 should supply a small positive potential, for example, 1.5 volts, to each of the conductors 18 and 19 by means of which both the transistors 20 and 21 are held normally blocked, except when the negative clock pulses appear. These clock pulses unblock the transistors 20 and 21 alternately for a given time $t$. When either transistor is unblocked it acts as a switch to connect the source 14 to the corresponding series of trigger windings 7 through conductor 62 or 63. The source 14 will be assumed to supply a predetermined constant voltage E.

The starting windings 8 are connected in series through a switch 22 to a direct current source 23 used for starting the distributor in a manner to be explained below. Elements 22 and 23 are intended to represent any suitable starting means, according to the circumstances in which the distributor is used.

Finally, four output transistors 24, 25, 26 and 27 are connected respectively to the output windings 9 of the four cores. Thus, in the case of the transistor 24, the winding 9 of the core 1 is connected in series with a resistor 28 shunted by a capacitor 29 between the emitter electrode and the base electrode. Two conductors 30 and 31 are connected respectively to the emitter and collector electrodes. The transistor is normally blocked so that the impedance connecting the conductors 30 and 31 is high. When the transistor 24 is unblocked by the resetting of core 1, as will be explained below, the impedance connecting these conductors becomes very small, so that the transistor acts substantially as a switch or gate. The other transistors 25, 26 and 27 are connected in like manner to the windings 9 on the cores 2, 3 and 4.

The distributor operates in the following way. With the switch 22 closed, as shown, the source 23 supplies a current upwards through the starting windings 8, and this will produce a holding flux from left to right in the cores 2, 3 and 4 and from right to left in core 1, as indicated by the arrows. Core 1 will be biassed to the condition represented by the point 32 on the lower branch of the hysteresis curve shown in FIG. 2, and cores 2, 3 and 4 will be biassed to the condition represented by the point 33 on the upper branch. These points should be sufficiently far from the flux axis OB to ensure that no core can be triggered or switched by a pulse supplied to conductor 62 or 63. To start the distributor, the switch 22 is opened, thus cutting off the holding current. Core 1 will be left in the "set" condition represented by the point 34 on the lower branch of the curve, and cores 2, 3 and 4 will be left in the "reset" condition represented by the point 35 on the upper branch.

When the transistor 21 is unblocked by a clock pulse, the source 14 of voltage E is connected to conductor 63 and supplies a current upwards through the windings 7 on cores 1 and 3. This produces a flux in each of these cores from left to right and the effect is to move the points 34 and 35 on the hysteresis curve FIG. 2 to the right. Thus core 1 is switched from the set to the reset condition, but core 3 being already in the reset condition is not switched.

The transfer transistor 11 is initially blocked because the base electrode is slightly positive to the emitter electrode. The switching of core 1 causes a pulse to be generated by the winding 5 in such a direction as to unblock the transistor 11, and this transistor acts as a switch to connect the winding 6 of core 2 to the source 14 of voltage E. A pulse of current is thereby passed upwards through the winding 6 of core 2. Winding 6 is wound straight, so the effect is to move the point 35 in FIG. 2 to the left, whereby the core 2 is switched from the reset to the set condition. The switching or setting of core 2 causes an output pulse to be generated in the output winding 9 thereon, which momentarily unblocks the transistor switch 25 thus effectively connecting the output conductors 30 and 31 together. The setting of core 2 also generates a pulse in the transfer winding 5 which, however, will be in the wrong direction to unblock the transistor 12. The resetting of core 1 produces an output pulse in the winding 9 thereon which is in the wrong direction to unblock the transistor switch 24. Thus it will be seen that the effect of the clock pulse supplied to conductor 19, which unblocks the transistor 21, is to reset core 1, to set core 2, and to close the transistor switch 25. Now core 2 is the only one of the four which is in the set condition, so that the next clock pulse, which comes from conductor 18, unblocks transistor 20, resets core 2, sets core 3, and momentarily closes the transistor switch 26, and so on. It will be clear that because the winding 5 on core 4 is connected to the transistor 10, the resetting of core 4 by the fourth clock pulse, which comes from conductor 18, causes core 1 to be set, so that counting in a ring continues indefinitely, or until stopped by closing the switch 22.

The operation of the arrangement will be described in rather more detail with reference to FIG. 3. A preliminary explanation will, however, first be given. Let $b$ be the flux at any time in one of the cores, and $n$ be the number of turns of a winding thereon, then the electromotive force generated in the winding is $e=n.db/dt$. In the case of cores having a hysteresis loop similar to FIG. 2, the rate of change of the flux $db/dt$ is practically constant and is substantially equal to $B/T$, where B is the total flux change when the condition of the core is reversed, and T is the time taken for the reversal to take place. Thus approximately $E=n.B/T$. It follows that if a constant voltage E be applied to the winding, the time T taken for the change of flux to be completed is equal to $n.B/E$. Accordingly, in order to ensure that the core is completely switched, the voltage E must be applied at least for the time $nB/E$. In other words, a trigger pulse of voltage amplitude E and duration T will complely switch the core if $ET=nB$. Since B is determined by the core material used, and $n$ is the number of turns selected for the winding to which the trigger pulse is applied, the volt-time product ET of the pulse which is sufficient to switch a core completely is predetermined. In some cases the volt-time product ET may exceed $n$B, but if ET is made equal to $n$B then it is possible to arrange so that when the trigger pulse is supplied simultaneously to more than one core, only one of them is switched.

Figure 3:
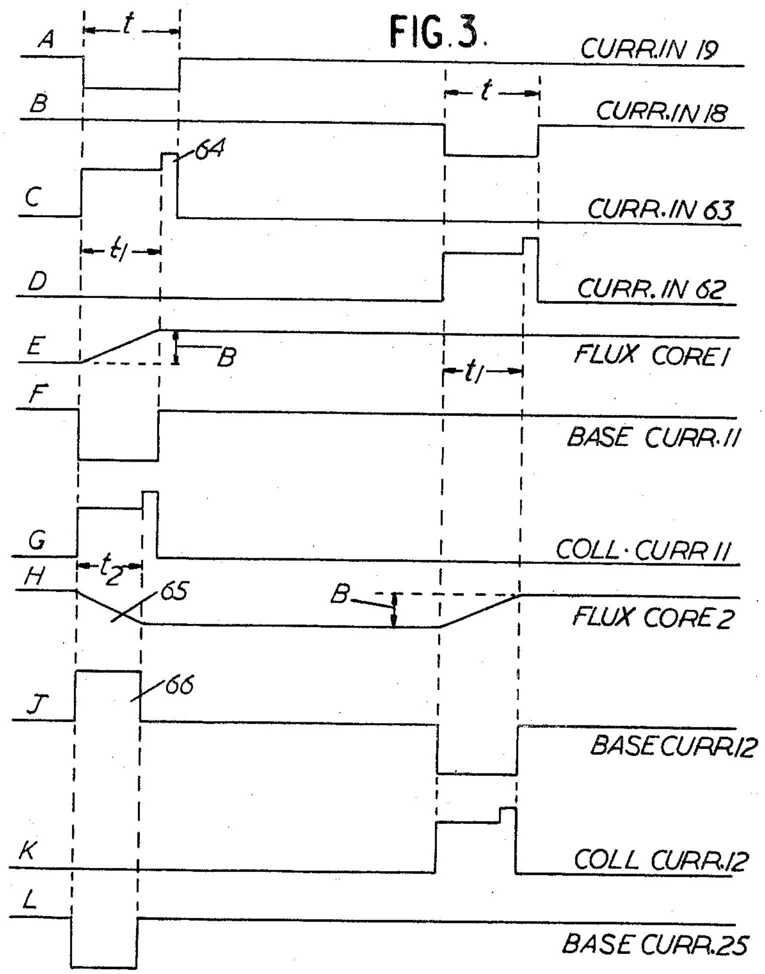

Referring now to FIG. 3, graphs A and B respectively show the negative clock pulses supplied to conductors 19 and 18, and graphs C and D show the corresponding pulses of current supplied to conductors 63 and 62, by the unblocking of transistors 21 and 20, respectively. Graph E shows the flux change in core 1 produced by the current in winding 63, and will be assumed to be a total flux increase of B as indicated. Accordingly to the explanation given above, the time $t_1$ necessary for this flux change to be completed is $n_1B/E$ where $n_1$ is the number of turns of the winding 7. Thus it is necessary that the duration $t$ of the clock pulse, graph A, should not be less than $t_1$ to ensure that core 1 is completely switched. The sudden cessation of the flux-change causes the momentary increase of the current in the winding 7 as shown at 64, graph C.

The switching of core 1 causes a negative unblocking pulse of current shown in graph F to be applied to the base electrode of the transfer transistor 11 from the winding 5, and graph G shows the current in winding 6 of core 2 caused by the application of the voltage E thereto by the unblocking of the transistor 11. The core 2 being in the reset condition (that is, corresponding to a point on the upper branch of the hysteresis curve, FIG. 2), the current pulse, graph G causes the decrease in the flux in core 2 shown at 65 in graph H. This decrease is completed in a time $t_2=n_2.B/E$ where $n_2$ is the number of turns of the winding 6 on core 2. In order to ensure that the flux change is completed, $t_2$ should not exceed $t_1$, which means that $n_2$ should not exceed $n_1$.

Graph J shows at 66 the positive current pulse supplied to the base electrode of the transistor 12 by the setting of core 2, and this pulse is in the wrong direction to unblock transistor 12, so no effect is produced on core 3.

The switching of core 2 applies a negative unblocking pulse shown in graph L to the switch transistor 25.

The clock pulse shown in graph B has no effect on core 1, but switches core 2 in the manner described for core 1, and core 2 switches core 3 as explained, but not illustrated in FIG. 3.

Considering now the operation of the switch transistors 24 to 27, it will be noted that by the rectifying action of the emitter contact the capacitor 29 becomes charged to a potential which holds the transistor blocked, and it only becomes unblocked when the output pulse is generated by the winding 9 on the setting of the corresponding core.

It will be evident that any even number of cores can be arranged in a ring in the manner shown in FIG. 1, with the necessary number of additional transfer transistors such as 10 and output or switch transistors such as 24.

One of the advantages of the arrangement is that by using transistors as transfer devices all danger of backward operation is avoided. Another advantage is that there is no load on any core while it is being set or reset, so that the operation of the cores is more positive. It should be mentioned that, in principle, one of the clock transistors 20 or 21 could be omitted, the other supplying windings on all the cores. This would enable an odd number of cores to be used, but it has the objection that adjacent cores are then coupled by the trigger windings so that the setting of a core tends to oppose the resetting operation of the previous core by the clock pulse. This could be overcome by the use of delaying or storage arrangements, but the circuit of FIG. 1 is simpler.

Figure 4:
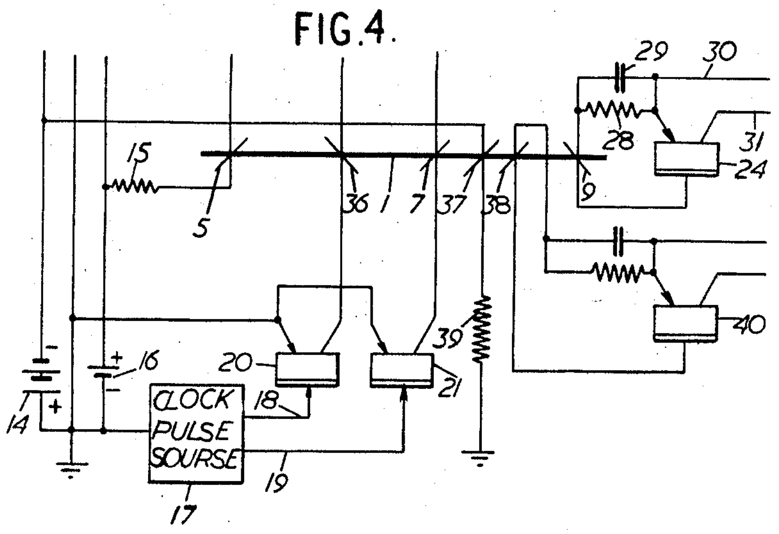
FIGS. 4 and 5 show modifications of parts of FIG. 1.

In some cases it may be preferable that the distributor stages should not be arranged in a ring, as in FIG. 1, but that after all the stages have operated, the distributor should be re-started from the first stage by separate means. One way of arranging this is shown in FIG. 4, which shows a modification of the lower part of FIG. 1. Stage 4 (or the last stage when there are more than four stages) is not required, so core 4 and transistors 13 and 27 in FIG. 1 are omitted. It will also be assumed that the starting windings 8 of the cores are not required, nor the starting elements 22 and 23, so these elements are not shown in FIG. 4, but can be provided if required.

In FIG. 4 only core 1 is shown, but the connections to the other cores will be as shown in FIG. 1. The transistor 10 of FIG. 1 is not required and has been omitted in FIG. 4, as also has the setting winding 6 on core 1. This core is, however, provided with three additional windings, namely a trigger winding 36 wound straight and connected in series with the collector electrode circuit of the clock transistor 20, a bias winding 37 wound reverse, and a second output winding 38 also wound reverse, and having the same number of turns as winding 7; for example, 20 turns. The bias winding 37 is connected in series with a resistor 39 between the source 14 and ground, the arrangement being such as to produce a bias flux from left to right in core 1. The output winding 38 is connected to an output transistor 40 arranged in the same way as the transistor 24. Transistor 40 performs the function of the transistor 27 of FIG. 1 which is omitted.

After the distributor has completed one cycle of operation, all the cores will be left in the reset condition (that is, in a condition corresponding to some point on the upper branch of the hysteresis curve, FIG. 2) because the resetting of the last core (No. 3 in FIG. 1) does not now cause core 1 to be set. The bias current through the bias winding 37 should be adjusted so that the condition of the core 1 is represented by a point such as 41 (FIG. 2) a little to the right of the point 35. The clock transistor 20 now applies a trigger pulse to the winding 36 which moves the point 41 to the left and triggers core No. 1 from the reset to the set condition. The output winding 38 is in the direction to unblock the transistor 40 in response to this trigger pulse, but the transfer winding 5 is in the wrong direction to produce any effect on core No. 2 through the transfer transistor 11 (FIG. 1). The next trigger pulse, which now comes from transistor 21, resets core 1, and sets core 2 in the manner described with reference to FIG. 1, and transistor 24 is now unblocked. The operation of the other cores now proceeds as previously described. It will be noted that in the arrangement of FIG. 4, core 1 is set directly by a trigger pulse instead of indirectly by the resetting of the last core, and that the first two transistor switches 40 and 24 are both operated by the triggering of core No. 1.

It should be mentioned that in this case the volt-time product ET of the trigger pulses should be chosen equal to $n_1$B, where $n_1$ is the number of turns of the trigger windings 7 and 36. Then the trigger pulses from the clock transistor 20, after the first one, are unable to switch core No. 1 because of the bias. The reason is that one of the other cores, which are not biassed, will reach the triggering point first, and all the energy of the trigger pulse wil be used up in switching that other core, before core 1 can begin to be switched. It is only when the last core has been switched that a trigger pulse from the transistor 20 is able to switch core No. 1.

It should be also noted that the bias current of core No. 1 should not exceed the value necessary to produce the field $h$ shown in FIG. 2 in order that after core 1 has been triggered by the first clock pulse it will be left in the set condition corresponding to the point 42 on the lower branch of the curve.

It should be mentioned that a similar result can be obtained without the use of the bias winding 37, if the winding 36 be given fewer turns than the winding 7. For example, the winding 36 could have 8 turns. In this case, if all the cores are in the reset condition, the current of the trigger pulse from the transistor 20 will rise until the core 1 is set, but if any other core is in the set condition that core will be switched before core 1 is switched, and will then use up all the energy of the pulse.

One of the applications of the distributor described with reference to FIG. 1 or 4 is to multichannel time division communication systems, and in such systems it is sometimes convenient to provide a separate time-division system for conveying the supervisory signals. Such signals do not require so wide a frequency band as speech signals, and it is therefore possible to transmit two or more different supervisory signals for each channel within the speech frequency bandwidth. For example, for a system providing 24 speech channels, a 48-channel system may be provided for the supervisory signals, so that two kinds of supervisory signal are available for each speech channel.

Figure 5:
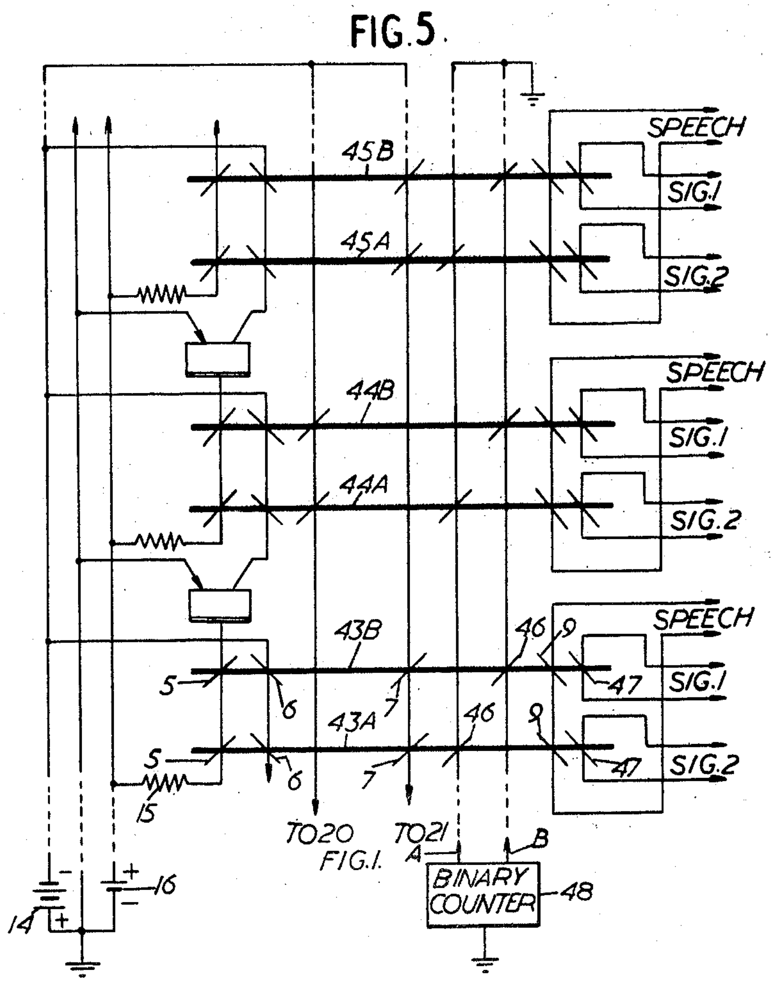

The distributor which has been described may be economically adapted to provide simultaneously the channel selection for both the 24 and the 48 channel systems, by providing two cores for each stage of the distributor, as will be understood from FIG. 5. The arrangement may be extended on similar lines; for example to provide channel selection for $n$ speech channels and $mn$ supervisory channels by using $m$ cores for each stage.

In FIG. 5 is shown part of a distributor which may, for example, provide selection for 24 speech channels and 48 supervisory signal channels. Only three pairs of cores are shown corresponding to three successive stages of the distributor. The arrangement is generally the same as that shown in FIG. 1 or 4 except that each core is replaced by two cores. FIG. 5 does not include the starting arrangements shown in FIG. 1, which are not required.

The cores shown in FIG. 5 are designated 43A, 43B; 44A, 44B; and 45A, 45B. In addition to the windings 5, 6, 7 and 9, each core has a blocking winding 46 wound reverse, and a second output winding 47 wound straight. A two-condition device or binary counter 48 has two output terminals A and B. The A terminal is connected to all the windings 46 on the A cores and the B terminal is connected to all the windings 46 on the B cores. The counter 48 should be designed to supply a bias current to the blocking windings on the A cores of sufficient magnitude to prevent any of them from being triggered for a period of one complete distributor cycle, and then to transfer the bias current to the B cores for an equal period, and so on. Thus it will be seen that the A and B cores are respectively operative during alternate distributor cycles. The counter 48 should be synchronised by the clock pulse source 17 (FIG. 1 or 4).

The output windings 9 of each pair of cores are connected in series to an output circuit corresponding to a speech channel, which circuit may comprise a transistor switch (not shown) such as 24 FIG. 1, and arranged in like manner. It will be seen that, as regards the speech channels, the distributor behaves exactly as that of FIG. 1 or 4, since an output is obtained whichever core of each pair is operative. The windings 47 are, however, connected to separate output circuits corresponding to the two supervisory signals. These output circuits are designated Signal 1 and Signal 2 and may comprise transistor switches (not shown) similar to 24. Thus it will be evident that, during one cycle of the distributor, selection is made of the 24 No. 1 supervisory signal channels and, during the next cycle, selection is made of the 24 No. 2 supervisory signal channels. The distributor thus behaves as a 24 channel distributor for speech channels and as a 48 channel distributor for supervisory signal channels.

It should be pointed out that the bias current supplied to the blocking windings 46 on the cores should be in such direction as to bias the cores with a flux from left to right so that when the bias current is removed the cores will be left in the reset condition.

It will be evident that each stage could comprise a group of any number $m$ of normally blocked cores, adapted to be successively released during corresponding cycles of the distributor by an $m$ stage counting device which takes the place of the binary counter 48. Then the $m$ cores could provide one speech output and $m$ signal outputs, for example, or various other combinations of outputs according to the output windings which are provided and their manner of connection.

Figure 6:
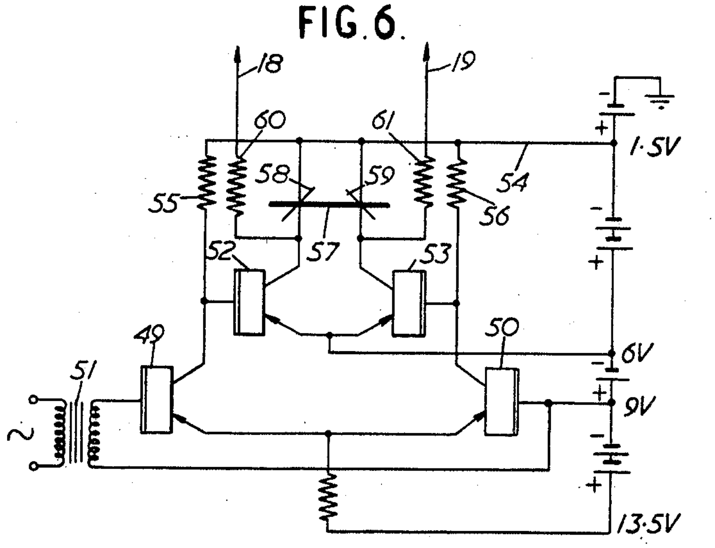
FIG. 6 shows a schematic circuit diagram of a pulse generator used in the circuits of the invention.

FIG. 6 shows one form which the clock pulse source 17 of FIGS. 1 and 4 may take. It comprises a pair of transistors 49, 50 arranged in the manner of a "long tailed pair" on a grounded emitter basis. A sinewave is supplied through a transformer 51, the secondary winding of which is connected to the base electrodes of transistors 49, 50. Two grounded-emitter transistors 52, 53 are arranged in push-pull, with their base electrodes connected respectively to the collector electrodes of transistors 49 and 50, and to a conductor 54 at a small positive potential (for example, 1.5 volts) through respective resistors 55 and 56.

A magnetic core 57 has two similar oppositely wound windings 58 and 59. The collector electrodes of transistors 52 and 53 are connected to conductor 54 through the windings 58 and 59 as shown, and to the output conductors 18 and 19 through equal resistors 60 and 61.

The circuit operates in the following way. During the period of a half-sinewave when the base electrode of transistor 49 is positive to that of transistor 50, transistor 49 is blocked and 50 is unblocked, and also 52 is unblocked and 53 is blocked. This means that a current flows upwards through winding 58 producing a flux from left to right in the core 57. During the period of the next half wave the conditions of transistors 52 and 53 will be interchanged and current now flows upwards through the winding 59 thus producing a flux in the core from right to left. The effect of the sinewave is thus to reciprocate the flux in the core 57, and short pulses are produced alternately on conductors 18 and 19 of amplitude and duration corresponding to the flux reversal of the core.

While the principles of the invention have been described above in connection with specific embodiments, and particular modifications thereof, it is to be clearly understood that this description is made only by way of example and not as a limitation on the scope of the invention.

What we claim is:

1. An electric pulse distributor comprising:

a first plurality of similar cores of saturable ferromagnetic material having a substantially rectangular hysteresis loop;

a plurality of sequentially operated transfer circuits each comprising an amplifying means having an input winding linked to one of said cores and an output winding linked to an adjacent core on which is also linked the input winding of the adjacent transfer circuit;

means for magnetizing one of said cores to assume a first, or set, condition, and for magnetizing the remaining cores to assume a second, or reset, condition;

a pulse source having a first output providing a first train of current pulses and a second output providing a second train of current pulses, said first and second train of pulses being interleaved in time;

a first trigger circuit having trigger windings including a series connection of said trigger windings linking alternate ones of said cores and a first switching means coupled between said first output of said pulse source and the first of said trigger windings of said alternate ones of said cores;

a second trigger circuit having trigger windings including a series connection of said trigger windings linking the remaining ones of said cores and a second switching means coupled between said second output of said pulse source and the first of said trigger windings of said remaining ones of said cores;

said first and second switching means alternately applying a current pulse to said trigger windings of said alternate ones of said cores and said trigger windings of said remaining windings of said cores for cyclically reversing the magnetic condition of only that core which has assumed the set condition;

said reversal including a pulse in the input winding of the transfer circuit connected to the last named core;

said induced pulse having a polarity such that a current pulse flows only in the output winding of said last named transfer circuit whereby the magnetic condition of said adjacent core is reversed from the reset condition and becomes the only core to assume the set condition preparatory to the application of the next current pulse; and coil means coupled to each of said cores for deriving an output pulse therefrom as it is reversed to its set condition.

2. A distributor according to claim 1 in which the sequentially operated transfer circuits are arranged effectively in a ring, the output winding of the last amplifying means of the series being coupled to the input winding of the first amplifying means.

3. A distributor according to claim 1 in which an additional input winding, output winding, trigger winding, and coil means are connected in series with, and wound in the same direction as, said first mentioned corresponding windings and further comprising:

a second plurality of cores similar to said first mentioned cores; each of said second plurality of cores being linked with one group of said additional windings;

blocking windings on all of said cores;

a two-condition device for supplying a bias current to the blocking windings sufficient to prevent alternately said first plurality of cores from being triggered while said second plurality of cores is being triggered by said interleaved trains of current pulses.

4. A distributor according to claim 1 further comprising a gating circuit connected to each of said coil means.

5. A distributor according to claim 1 in which said first trigger circuit also includes an extra trigger winding on the first core of the distributor, said extra winding being wound in opposition to the winding on the same core included in said second trigger circuit, comprising means for causing a trigger pulse supplied to said first circuit to switch the core in the first stage to the set condition only if a core in no other stage is in the set condition.

6. A distributor according to claim 5 in which the last-mentioned means comprises means for magnetically biasing each core in the first stage in such manner as to prevent it from being switched by a trigger pulse if any other core is in a condition to be switched thereby, the volt-time product of the trigger pulses being just sufficient completely to switch one core only.

7. A distributor according to claim 1 in which said amplifying means comprises a transistor.

References Cited in the file of this patent

UNITED STATES PATENTS

| | | |
|---|---|---|
| 2,708,722 | Wang | May 17, 1955 |
| 2,747,110 | Jones | May 22, 1956 |
| 2,751,546 | Dimmer | June 19, 1956 |
| 2,784,390 | Chien | Mar. 5, 1957 |
| 2,819,395 | Jones | Jan. 7, 1958 |
| 2,846,669 | McMillian et al. | Aug. 5, 1958 |
| 2,866,178 | Lo et al. | Dec. 23, 1958 |
| 2,911,626 | Jones et al. | Nov. 3, 1959 |
| 2,955,264 | Kihn et al. | Oct. 4, 1960 |
| 3,011,159 | Glaser et al. | Nov. 28, 1961 |

OTHER REFERENCES

"Transistor-Memory Core Binary Divider Circuit," by G. Samuel and L. Stambler in "RCA Technical Notes," No. 322, November 1959.